United States Patent
Gubarev et al.

(10) Patent No.: US 6,886,736 B1
(45) Date of Patent: May 3, 2005

(54) METHOD OF DIFFUSION WELDING OF DIFFERENT METALS IN AIR

(76) Inventors: Veniamin V. Gubarev, Apt. 53, House 5, Aerodromnaya Street, Samara, 443070 (RU); Alexander V. Gubarev, Apt. 55, House 19, Maslennikov Lane, Samara, 443068 (RU); Vladimir V. Gubarev, Apt. 22, House 212, Chapaevskaya Street, Samara, 443010 (RU); Vladimir I. Yudakov, Apt. 14, House 131, Moskuvskoya Shosse, Samara, 443001 (RU); Pavel V. Korchagin, Apt. 81, House 30, Building 1, Beskudnikovsky Blvd., Moscow, 127474 (RU)

( * ) Notice: Subject to any disclaimer, the term of this patent is extended or adjusted under 35 U.S.C. 154(b) by 15 days.

(21) Appl. No.: 10/680,497

(22) Filed: Oct. 7, 2003

(51) Int. Cl.[7] .......................... B23K 28/00; B23K 13/01
(52) U.S. Cl. .................. 228/193; 228/194; 228/203; 219/617
(58) Field of Search ................... 228/193–196, 228/199, 203, 205; 219/603–617

(56) References Cited

U.S. PATENT DOCUMENTS

| | | | | |
|---|---|---|---|---|
| 3,567,903 A | | 3/1971 | Parker | 219/149 |
| 3,964,667 A | * | 6/1976 | Anderson | 228/194 |
| 4,152,489 A | * | 5/1979 | Chottiner | 429/27 |
| 4,325,734 A | * | 4/1982 | Burrage et al. | 419/60 |
| 4,784,313 A | * | 11/1988 | Godziemba-Maliszewski | 228/194 |
| 5,000,368 A | * | 3/1991 | Turner | 228/131 |
| 5,731,046 A | * | 3/1998 | Mistry et al. | 427/553 |
| 5,831,252 A | * | 11/1998 | Shimizu | 219/603 |
| 5,858,144 A | * | 1/1999 | Barton et al. | 156/89.28 |
| 5,875,954 A | * | 3/1999 | Kishi et al. | 228/194 |
| 5,922,628 A | * | 7/1999 | Barton et al. | 501/52 |
| 6,323,458 B1 | * | 11/2001 | Nomura et al. | 219/148 |
| 6,378,760 B1 | * | 4/2002 | Shimizu et al. | 228/193 |
| 6,514,631 B1 | * | 2/2003 | Yamamoto et al. | 428/682 |
| 2004/0020769 A1 | * | 2/2004 | Ivannov et al. | 204/298.12 |
| 2004/0025323 A1 | * | 2/2004 | Asaka et al. | 29/598 |

FOREIGN PATENT DOCUMENTS

| | | | |
|---|---|---|---|
| JP | 408323451 A | * | 12/1996 |
| RU | 2 202 455 C2 | | 4/2003 |

* cited by examiner

*Primary Examiner*—Kiley S. Stoner
(74) *Attorney, Agent, or Firm*—Steven E. Kahm; Nikolai & Mersereau, P.A.

(57) ABSTRACT

A method of diffusion welding of different metals is accomplished while applying pressure to the butt area and homogeneous heating the butt area to about 0.8 to about 0.9 the melting point of the metals to be welded. Additional heat pulses are then supplied to the butt area. The number of additional heat pulses depends on the diameter of the pieces to be welded. The heat pulses provide for a more even temperature distribution over the butt area and increases the number of active diffusion centers to enhance the diffusion process. The method is useful for different refractory and stainless steels and alloys. The resultant diffusion welds do not produce burring.

2 Claims, No Drawings

METHOD OF DIFFUSION WELDING OF DIFFERENT METALS IN AIR

BACKGROUND OF THE INVENTION

This invention relates to pressure welding, more specifically, to the diffusion welding of different metals in air using mechanical processing of the surfaces to be welded, applied compression force, heating of the butt area up to the welding temperature and additional heating pulses.

DESCRIPTION OF THE RELATED ART

Diffusion welding by use of pressure pulses and heating during the welding process enhances the diffusion of the metals during the welding process.

Other diffusion welding techniques use a controlled pressure pulse and a controlled electrical or electromagnetic energy to the pressed body. Pulses of electrical energy are used to bond particles to each other or to skins, membranes or filaments of weldable material.

The one of the main drawbacks of the above techniques are that they cause deformation of the pieces to be bonded and a burring at the butt area. The welding of the two pieces are not complete and the mechanical characteristics of weld junctions in the periphery and central spots of the pieces to be welded will be different.

Further hydrogen is burnt out in the butt areas. The length of the time spent welding is long and there is an uneven distribution of the welding temperature across the butt surfaces.

SUMMARY OF THE INVENTION

Diffusion welding in air is improved by using heat pulses. The pieces to be welded are polished at their adjoining faces and a protective hydrocarbon compound is applied to prevent oxidation during welding. The pieces to be welded are pressed together, heat is steadily applied to the butt area up to the welding temperature and then the heating is paused and several additional heating pulses (depending on the diameter of the pieces to be welded) are applied to even out the distribution of heat across the butt area of the weld, resulting in a better diffusion and a better weld. The welding temperature used is on the order of 80 to 90 percent of the melting point of the metals to prevent deforming of the metals and burring in the butt area. The pressure is removed after the compressive force is applied during the welding process.

OBJECTS OF THE INVENTION

It is an object of the invention to improve the quality of the weld junction.

It is an object of the invention to improve the continuity of the properties of the welded piece across the butt area.

It is an object of the invention to provide an even temperature distribution across the weld junction for more even diffusion.

It is an object of the invention to provide welds without burring.

It is an object of the invention to use heating pauses and heating pulses to enhance the temperature distribution across the weld junction for more even diffusion.

It is an object of the invention to obtain a homogeneous weld across the butt area.

Other objects, advantages and novel features of the present invention will become apparent from the following description of the preferred embodiments when considered in conjunction with the accompanying drawings.

DESCRIPTION OF THE PREFERRED EMBODIMENTS

To begin the welding process two different metals are selected for welding. The butt areas are polished to obtain two flat surfaces. A protective hydrocarbon compound to prevent oxidation during welding is applied to the surfaces to be welded. The hydrocarbons will turn to gasses during the welding process and prevent oxidation of the metal surfaces during welding.

The metals are pressed together and heated. The heat is preferably supplied to the butt area by induction heating such as by a loop inductor fed from a high frequency generator.

The materials to be welded are heated to a temperature of about 80% to 90% of the melting point of the lower of the two materials. This prevents melting, maintains the shape of the materials and prevents burring across the contact surface. Maintaining the temperature at about 80% to 90% of the melting point promotes a better diffusion without deforming the materials. The temperature of about 80% to 90% of the melting point of the lower melting point metal for the diameters of 8 mm to 22 mm is reached within 10 to 30 seconds. Then the heating is paused for approximately one or two seconds. The temperature at the butt area will drop. A heating pulse is then applied for about three seconds to bring the temperature of the butt area to about 80% to 90% of the melting point of the lower melting point metal.

During the diffusion welding process in air with pressure being applied the microroughnesses are squeezed and the surfaces to be welded achieve a closer contact to allow for the better development of diffusion. During the additional heating pulses the temperature is homogenized over the butt area the number of active centers is increased enhancing the diffusion process. The number of heating pulses used depends on the size of the butt area to be welded. For example for a 20 mm diameter weld of two pieces, two additional heat pulses of three seconds were used with a pause of two seconds.

The pressure diffusion welding method presented is particularly useful for cladding cutting tools. For example 20 mm milling cutters have been welded. 40H steel was used for the cladding piece and the cutting piece with R9K5 steel. Before welding the surfaces were dry polished and coated with a protective hydrocarbon compound layer to prevent oxidation. The pieces to be welded were assembled using a UDS-3 instrument and pressed together with 4 kg/mm$^2$ of pressure. The butt area was heated with a loop inductor fed from a high frequency generator. The protective coating decomposed during heating without forming any solid residues, and the gases formed due to its decomposition acted as oxidation protecting gases for the weld area.

In general a pressure of about 3 kg/mm$^2$ to about 5 kg/mm$^2$ is applied to the pieces to be welded depending on the diameter of the pieces to be welded to push them together during the welding process. After a temperature of about 1200° C. is achieved the generator is switched off for two seconds and then a heating pulse is supplied for three seconds followed by another two-second pause and another three-second-heat pulse. The welded pieces are then annealed. The resulting mechanical parameters of the weld junction are homogeneous across the junction and its strength is similar to that of 40H steel. Its plasticity is better than that of R9K5 steel. The plastic strain was within 4%.

The compound formation time was 25 seconds. Obviously, many modifications and variations of the present invention are possible in light of the above teachings. It is therefore to be understood that, within the scope of the appended claims, the invention may be practiced otherwise than as specifically described.

What is claimed is:

1. A method of diffusion welding of different metals in air comprising:

mechanically processing of the welded surfaces such as polishing to smooth the surfaces to be welded, applying a hydrocarbon coating to the surfaces to be welded, pressing the surfaces to be welded together while heating the pieces to be welded, heating the pieces to be welded by induction heating to about 80 percent to 90 percent of the melting point of the lower temperature melting point piece to be welded, providing additional heating pulses to the butt areas of the pieces after the welding temperature has been achieved, in order to improve the quality of the weld by homogenizing the temperature distribution over the butt area.

2. A method of diffusion welding of different metals in air as in claim 1 further comprising:

annealing the welded metals.

* * * * *